United States Patent [19]
Nickey et al.

[11] Patent Number: 5,711,777
[45] Date of Patent: Jan. 27, 1998

[54] GLASS GOB SHEARING APPARATUS WITH CONTACT LUBRICATED BLADES AND METHOD OF SHEARING EMPLOYING SAME

[75] Inventors: George A. Nickey, Maumee; Ronald T. Myers, Whitehouse; John M. Slifco, Toledo; Richard W. Craig, Toledo; Robin L. Flynn, Toledo, all of Ohio

[73] Assignee: Owens-Brockway Glass Container Inc., Toledo, Ohio

[21] Appl. No.: 602,873

[22] Filed: Feb. 6, 1996

[51] Int. Cl.$^6$ .............. C03B 7/10; C03B 40/02; B26D 7/08

[52] U.S. Cl. .............. 65/26; 65/133; 65/170; 65/332; 65/334; 65/356; 83/16; 83/169; 83/171; 83/623

[58] Field of Search .............. 65/26, 133, 170, 65/332, 334, 356, 174, 207, 221; 83/169, 171, 623, 16

[56] References Cited

U.S. PATENT DOCUMENTS

| | | | |
|---|---|---|---|
| 1,760,255 | 5/1930 | Peiler | 83/171 |
| 1,920,908 | 8/1933 | Lobb | 49/55 |
| 2,053,039 | 9/1936 | McSwain | 83/171 |
| 2,143,096 | 1/1939 | Wadsworth | 65/170 |
| 2,153,443 | 4/1939 | Wellnitz | 49/5 |
| 2,205,868 | 6/1940 | Wadsworth | 49/14 |
| 2,412,268 | 12/1946 | Honiss | 65/26 |
| 2,754,627 | 7/1956 | Denman | 65/170 |
| 3,264,077 | 8/1966 | Bishop | 65/24 |
| 3,758,286 | 9/1973 | Heyne | 65/334 |
| 3,817,133 | 6/1974 | Romberg | 65/133 |
| 3,962,939 | 6/1976 | Stengle, Jr. | 83/171 |
| 4,083,278 | 4/1978 | Steffan | 83/169 |
| 4,246,819 | 1/1981 | Dahms | 83/623 |
| 4,391,620 | 7/1983 | Geisel | 65/26 |
| 4,450,741 | 5/1984 | Mumford | 83/623 |
| 4,499,806 | 2/1985 | Mumford | 83/527 |
| 4,813,994 | 3/1989 | Kulig | 65/334 |
| 5,573,570 | 11/1996 | Leidy et al. | 65/334 |

*Primary Examiner*—Steven P. Griffin

[57] ABSTRACT

A parallel shear apparatus (20) for simultaneously shearing a plurality of streams of molten glass (A, B, C) into gobs comprising opposed carriages (22, 24) which are repetitively moved along rectilinear opposed paths toward and away from one another. Each of the carriages carries a plurality of shear blades (40a, 40b, 40c/42a, 42b, 42c) which cooperate with one another to shear the glass streams into gobs when the carriages are positioned close to one another. The shear blades carried by each of the carriages have internal flow passages (66) to permit the blades to be internally liquid cooled by liquid entering the carriages from inlet lines (52, 56), and the blades carried by one of the carriages (22) are biased by compression springs (82) into contact with the blades carried by the other carriage (24) to prevent excessive contact loads between the blades in their shearing positions. A contact lubricator (88) is provided to lubricate the contact surfaces of the blades carried by one of the carriages (22) by contact with such blades. The shear apparatus is employed in a method for shearing streams of molten glass by moving the carriages toward and away from one another to repetitively bring the free ends of the shear blades into partly overlapping relationship.

24 Claims, 11 Drawing Sheets

5,711,777

GLASS GOB SHEARING APPARATUS WITH CONTACT LUBRICATED BLADES AND METHOD OF SHEARING EMPLOYING SAME

FIELD OF THE INVENTION

This invention relates to an apparatus and method for sequentially shearing each of a multiplicity of streams of molten glass into individual gobs. More particularly, this invention relates to an apparatus and method of the foregoing character in which opposed sets of shearing blades are simultaneously moved toward and away from one another along opposed, rectilinear paths to overlap in shearing relationship approximately at the longitudinal central axes of the streams of molten glass that are being sheared. Even more particularly, this invention relates to an apparatus and method of the foregoing character in which each of the shearing blades is lubricated by contact with a lubricant dispensing device.

BACKGROUND OF THE INVENTION

In the manufacture of glass containers by a forming machine of the I.S. ("individual section") type, one or more streams of molten glass flow downwardly from a feeder bowl of a glass melting furnace forehearth toward a section of the molding machine, and each stream is severed or sheared into a multiplicity of individual gobs by a shearing device positioned between the feeder bowl and the molding machine. A typical device of the foregoing character includes opposed sets of shear blades, each set of shear blades being mounted on a carriage assembly, and driving apparatus for reciprocating each of the carriage assemblies toward and away from one another. Various shearing devices of this general character are disclosed in U.S. Pat. No. 4,813,994 (Kulig) and in U.S. Pat. No. 4,499,806 (Mumford), the disclosures of which are incorporated by reference herein.

It is important to properly lubricate the shear blades of a glass feeder shearing mechanism as described above to avoid excessive friction when they rub against one another in their overlapping, shearing positions. Heretofore, such lubrication has typically been accomplished by spraying a mist of a suitable lubricant against the blades as they reciprocate during their shearing cycles. However, this type of lubrication is difficult to control, and can be environmentally objectionable. It has also been proposed, in U.S. Pat. No. 3,264,077 (Bishop), the disclosure of which is incorporated by reference herein, that a lubricant be applied to a surface of a blade from a passage therein through a porous member affixed to the blade. However, this complicates the fabrication of a shear blade and adds to the cost thereof, which is undesirable because such shear blades need to be periodically replaced due to the wear that such blades undergo in normal service.

SUMMARY OF THE INVENTION

The foregoing and other problems of shearing devices with external lubricant spray systems are overcome with the shearing apparatus and method of the present invention, which utilizes a lubricant dispensing system to apply a carefully metered amount of lubricant by contact with one of the contact surfaces of the shear blades carried by one of the reciprocating carriages of the shearing device.

Accordingly, it is an object of the present invention to provide an improved parallel shear device and method for a glass forming machine of the individual section type. More particularly, it is an object of the present invention to provide an improved device and method for lubricating the contact surfaces of the blades of a parallel shear device of the foregoing character.

For a further understanding of the present invention, and the objects thereof, attention is directed to the drawing and the following description thereof, to the detailed description of the preferred embodiment of the invention, and to the appended claims.

In the Drawing

DETAILED DESCRIPTION OF THE PREFERRED EMBODIMENT OF THE INVENTION

Figure 1:
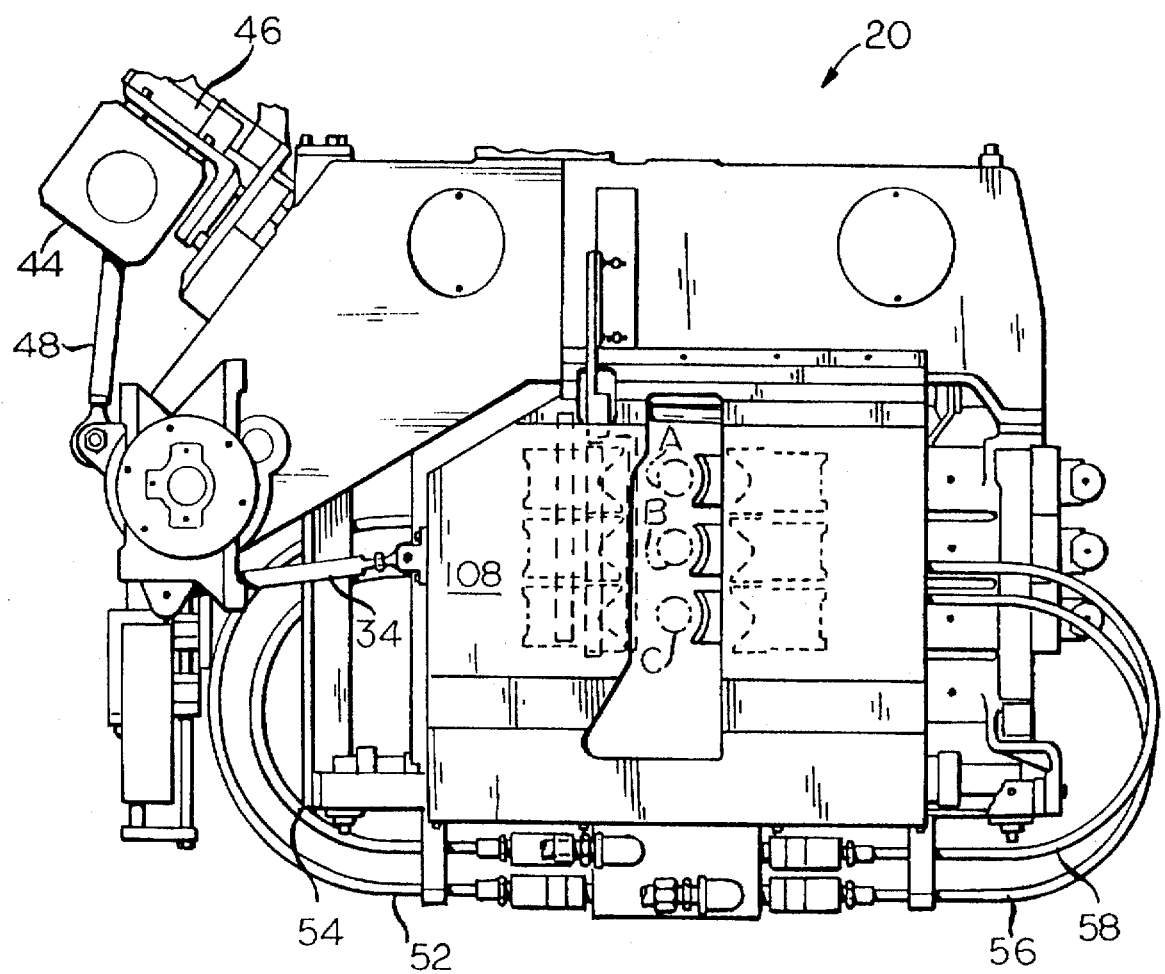
FIG. 1 is a plan view of a glass gob parallel shearing apparatus according to a preferred embodiment of the present invention.
Figure 2:
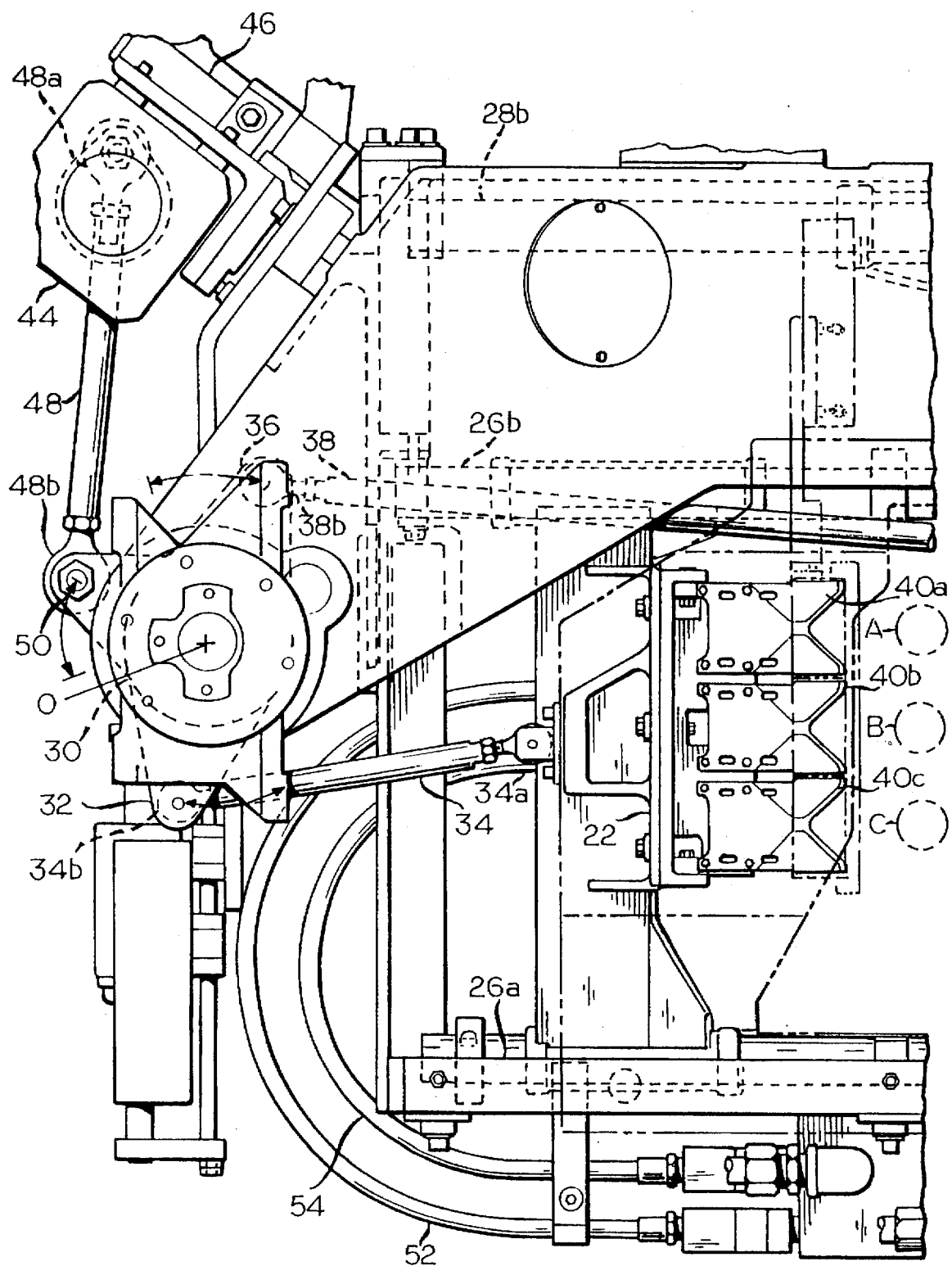
FIG. 2 is a plan view, at an enlarged scale, of the left hand portion of the apparatus of FIG. 1.
Figure 3:
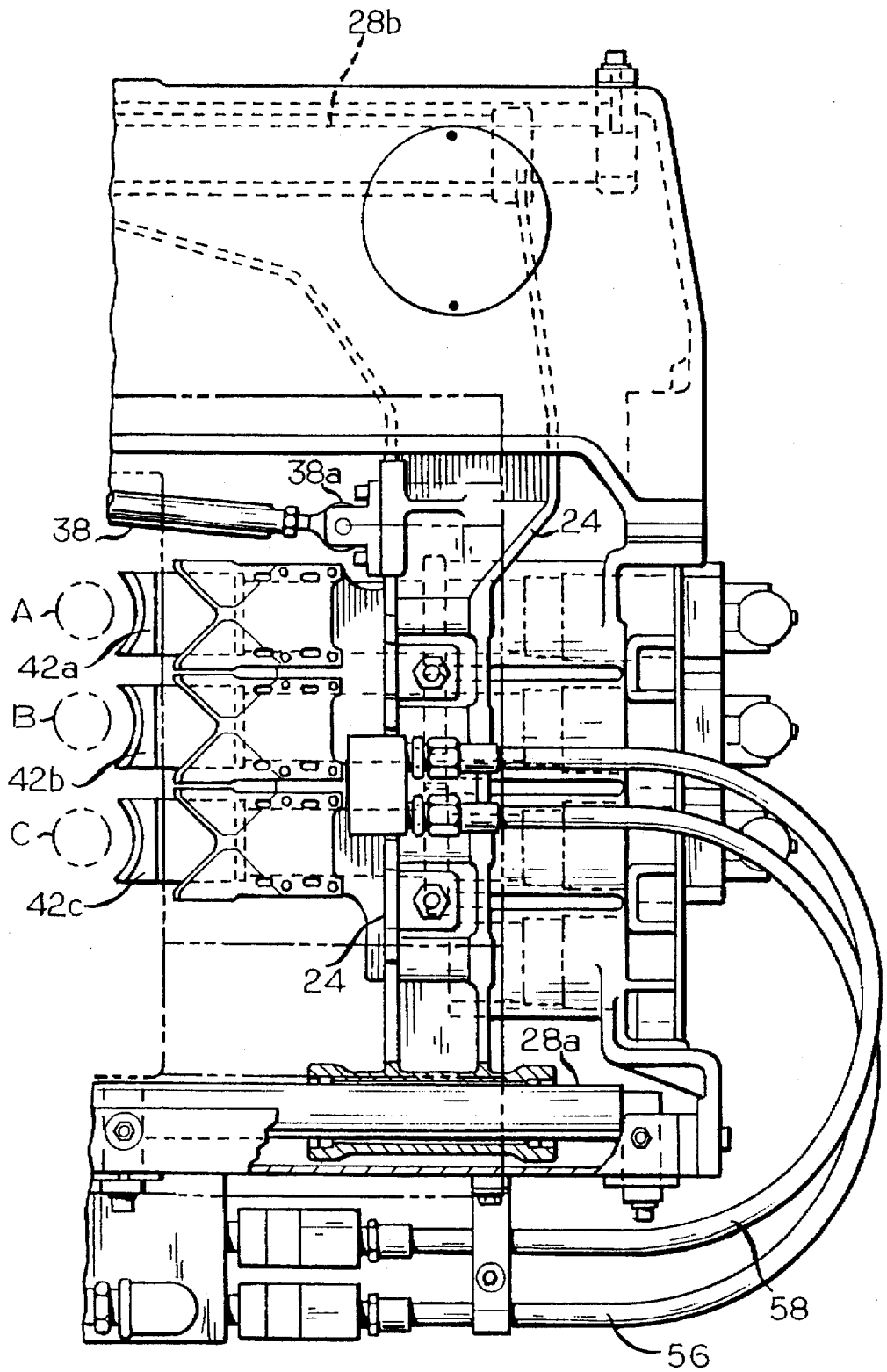
FIG. 3 is a plan view, at an enlarged scale, of the right hand portion of the apparatus of FIG. 1.

A parallel shear apparatus or device according to the preferred embodiment of the present invention is indicated generally by reference numeral 20 in the drawing and includes opposed shear blade carriages 22 and 24. The carriages 22 and 24 are mounted for reciprocating motion toward and away from one another, the carriage 22 being mounted on spaced apart, parallel tubular slides 26a and 26b and the carriage 24 being mounted on spaced apart, parallel tubular slides 28a and 28b. Preferably, the slides 26a and 26b are oriented to extend upwardly at a slight angle with respect to the orientation of the slides 28a and 28b, which preferably extend horizontally, to gradually bring the carriage 24 closer to the carriage 22 in a vertical direction as the horizontal distance therebetween is reduced.

The motion of each of the carriages 22 and 24 is rectilinear, and is simultaneously actuated by an oscillating bell crank 30. In that regard, the carriage 22 is connected to a throw 32 of the bell crank 30 by a connecting rod 34, an end 34a of which is pivotally attached to the carriage 22 and the other end 34b of which is pivotally attached to the throw 32 of the bell crank 30. Likewise, the carriage 24 is connected to a throw 36 of the bell crank 30 by a connecting rod 38, an end 38a of which is pivotally attached to the carriage 24 and the other end 38b of which it pivotally attached to the throw 36, the throws 32 and 36 being diametrically opposed to one another in their positions in relation to the bell crank 30.

The carriage 22 carries one or more horizontally extending double ended shear blades, shown as three, horizontally aligned shear blades 40a, 40b and 40c, one for each of the molten glass streams A, B and C flowing vertically from the glass feeder thereabove (not shown) with which the shear apparatus 20 is associated. Likewise, the carriage 24 carries a like number of horizontally extending double ended shear blades, shown as the horizontally aligned shear blades 42a, 42b and 42c. The shear blades 40a, 40b, 40c, 42a, 42b and 42c may be, and preferably are, identical to one another. As the bell crank 30 is caused to oscillate, by means which will hereinafter be described more fully, the carriages 22 and 24 are caused to move along parallel paths toward and then away from one another, to periodically bring the shearing ends of the opposed shear blades 40a and 42a, 40b and 42b, and 40c and 42d, respectively, into partly overlapping relationship with one another in alignment with the coplanar streams of molten glass A, B and C, respectively, to thereby shear the streams of molten glass A, B and C into discrete gobs for further processing into individual glass containers by a glass forming machine of the individual section type (not shown), which is positioned below the shear apparatus 20. The motion imparted to the carriages 22, 24 by the bell crank 30 through the connecting rods 34 and 38 will be harmonic in its velocity and acceleration characteristics. This will minimize inertial loads on the carriages 22 and 24 and thereby minimize wear on them.

The bell crank 30 is caused to oscillate about its central axis D by a unidirectionally acting a.c. servo motor and gear reducer combination 44, which is mounted on a bracket 46 and may be of conventional construction. The rotational movement of the servo motor gear reducer combination 44 is transmitted to the bell crank 30 by a connecting rod 48, an end 48a of which is pivotally attached to the servo motor gear reducer combination 44 at a location away from its axis of rotation, and the other end 48b of which is pivotally attached to a throw 50 of the bell crank 30 at a location between, and spaced from each of, the throws 32 and 36.

Figure 9:
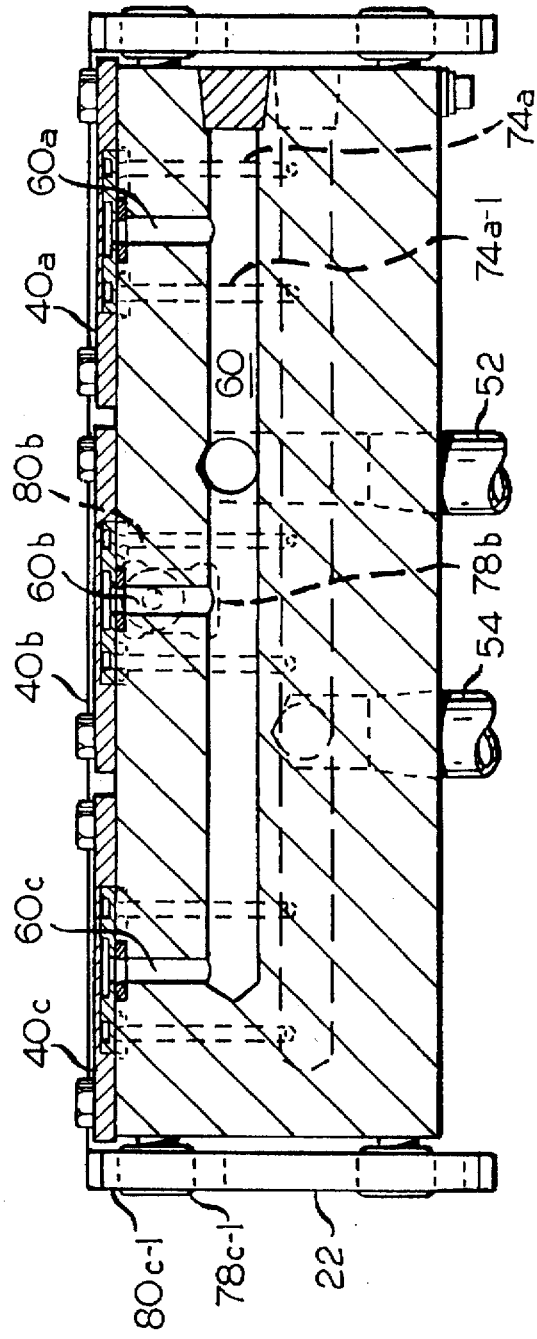
FIG. 9 is a sectional view taken on line 9—9 of FIG. 5.
Figure 8:
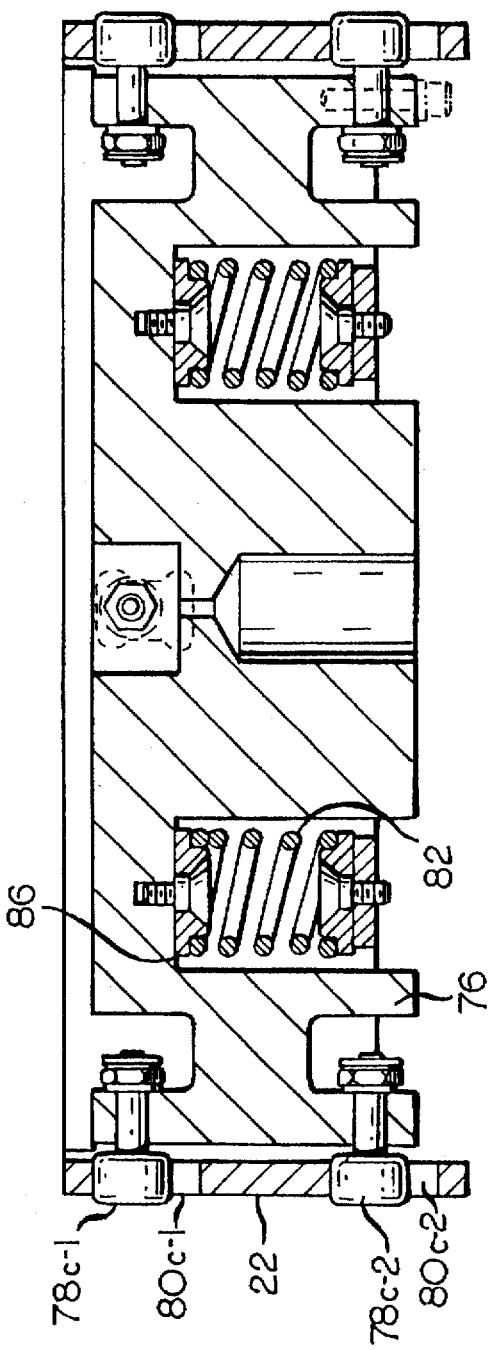
FIG. 8 is a sectional view taken on line 8—8 of FIG. 5.
Figure 10:
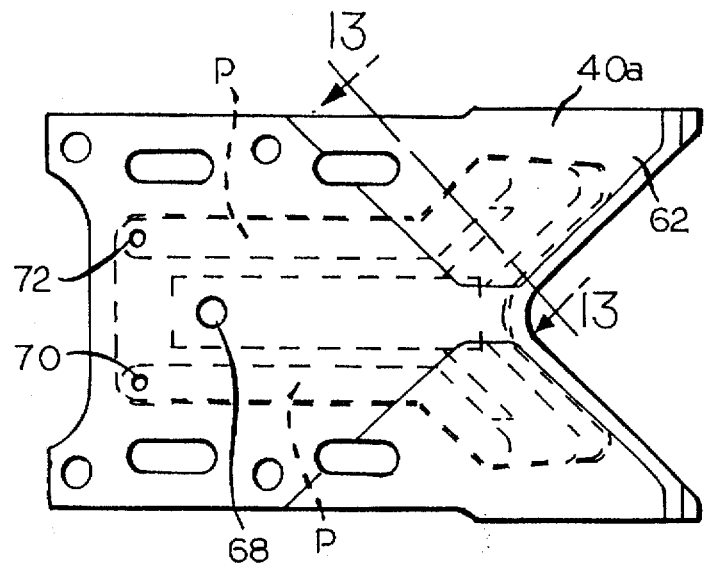
FIG. 10 is a top plan view of one of the elements of the apparatus of FIGS. 1 and 2.
Figure 13:
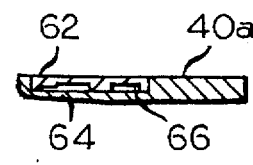
FIG. 13 is a sectional view taken on line 13—13 of FIG. 10.
Figure 12:
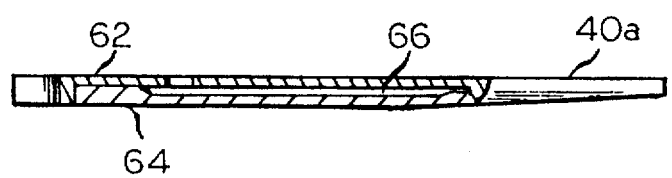
FIG. 12 is a sectional view taken on line 12—12 of FIG. 11.
Figure 11:
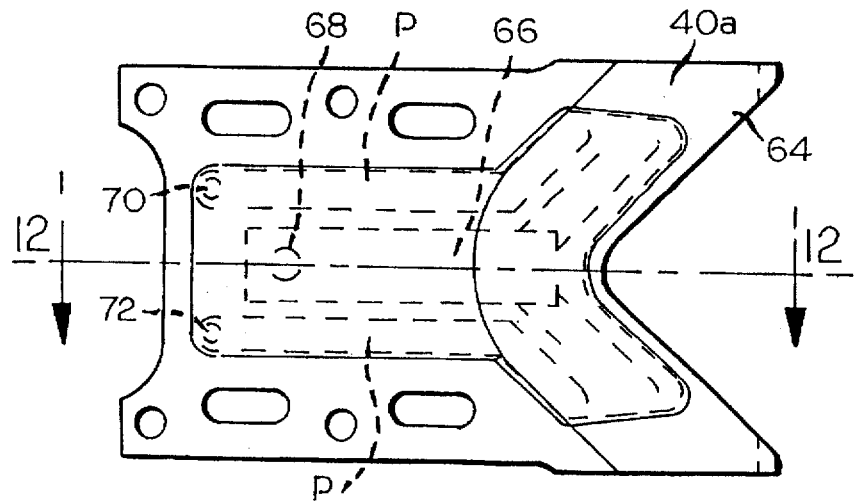
FIG. 11 is a bottom plan view of the element illustrated in FIG. 10.
Figure 14:
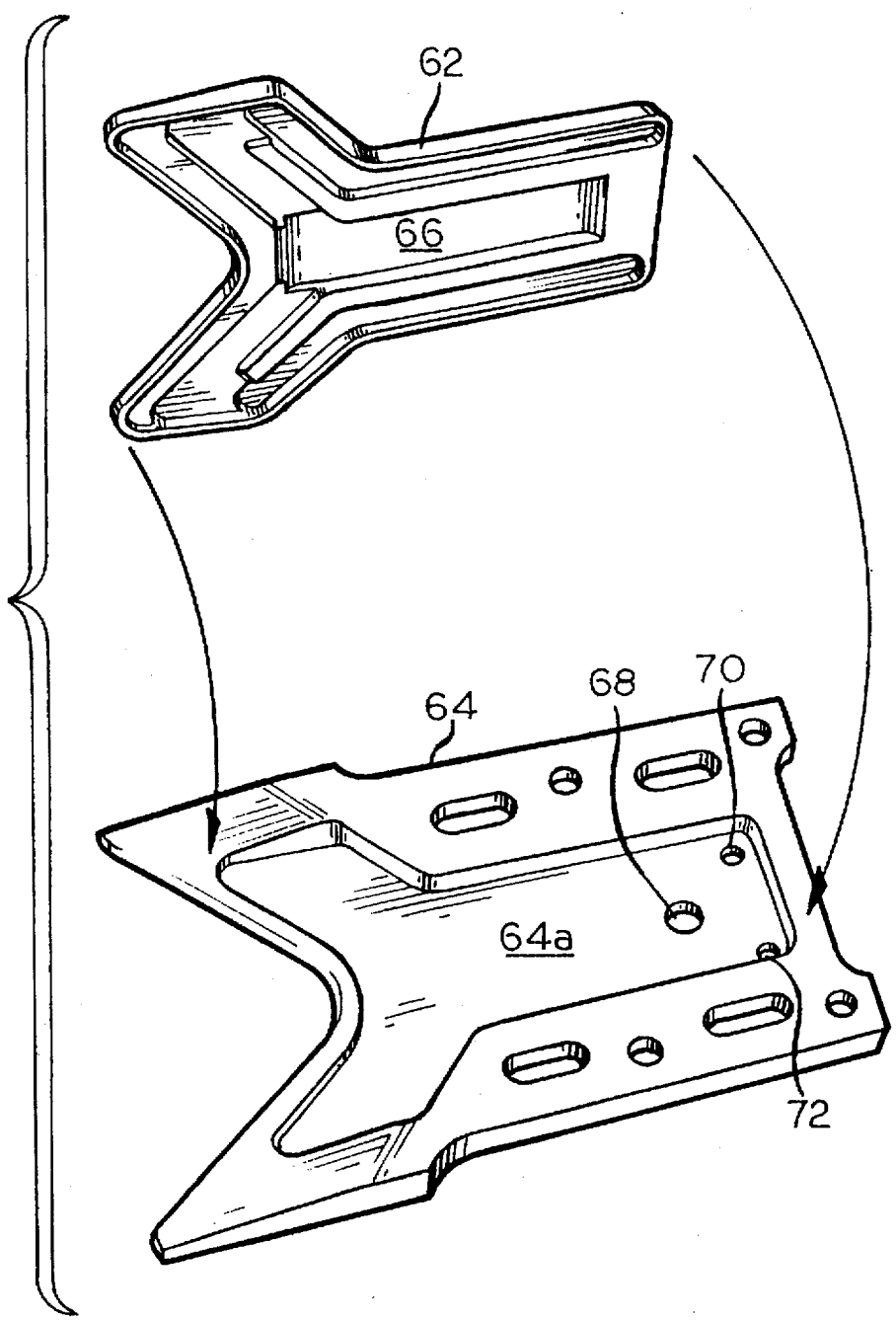
FIG. 14 is an exploded, perspective view of the element of FIGS. 10–13.

The blades 40a, 40b, 40c are internally liquid cooled, for example, by water, flexible inlet and outlet lines 52, 54, respectively, being provided to connect the carriage 22 to a source, not shown, of such cooling liquid. Likewise, the blades 42a, 42b, 42c are internally liquid cooled, flexible inlet and outlet lines 56, 58, respectively, being provided to connect the carriage 24 to a source, not shown, of such cooling liquid. As is shown in FIG. 9 for the blades 40a, 40b, 40c and in FIG. 6 for the blade 40c, cooling liquid flows from the inlet line 52 into an internal passage 60 in the carriage 22, and from the passage 60 into branch passages 60a, 60b, 60c which lead to the blades 40a, 40b, 40c, respectively.

FIGS. 10–14 illustrate the blade 40a, which is identical to the blades 40b, 40c, and to the blades 42a, 42b, 42c for that matter. The blade 40a is assembled from upper and lower pieces 62, 64, each of which is preferably formed from tool steel. The upper and lower pieces are continuously joined to one another around their respective peripheries, preferably by furnace brazing, to be liquid tight. The furnace brazing process will also harden the blade 40a. The upper and lower pieces 62, 64 are configured to define an internal flow passage 66 that leads from an inlet opening 68, which is in communication with the branch passage 60a, toward the shearing end of the blade 40a and back to a spaced apart pair of outlet openings 70, 72, as indicated by the path P for the blade 40c in FIG. 5. In that regard, the lower piece 64 has a pocket 64a machined into it, which serves to receive the upper piece 62, and the lower piece 64, thus, is the primary structural member imparting rigidity to the blade 40a. Further, the flow passage 66 is formed in the upper piece 62 by machining or investment casting. In any case, the outlet openings 70, 72 are in communication with branch passages 74a-1, 74a-2 of an outlet passage 74 in the carriage 22. The outlet passage 74, in turn, is in fluid communication with the outlet line 54.

Figure 4:
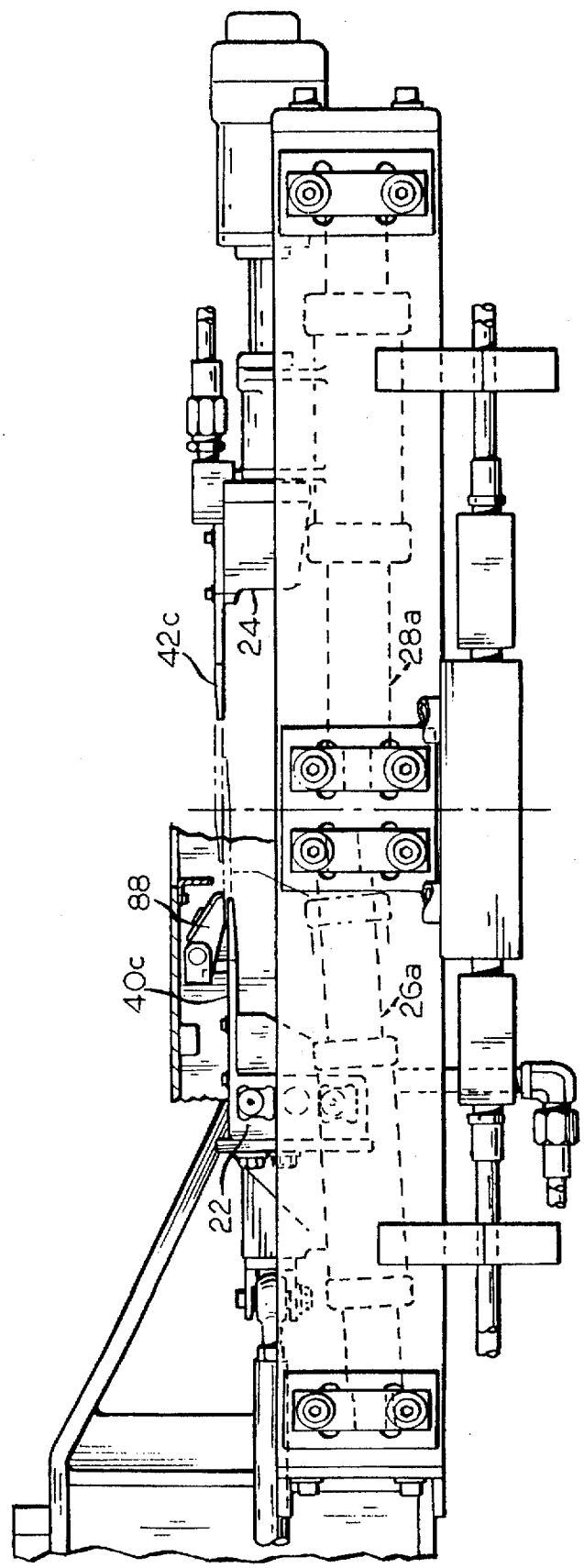
FIG. 4 is a front view, at an enlarged scale, of the apparatus of FIG. 1.

For proper shearing of the glass stream A, for example, the opposed shear blades 40a, 42a must contact each other when they overlap with one another at the innermost limits of their travel, in position to shear a gob of glass from the glass stream A, as indicated in phantom line in FIG. 4. The thickness of the blades 40a, 42a that is required to accommodate internal cooling, as heretofore described, precludes adequate deflection of the blades 40a, 42a when they engage one another in their overlapping positions, thus posing the risk of excessive contact loads on such blades. To avoid such risk, the blades carried by one of the carriages 22, 24, shown as the blades 40a, 40b carried by the carriage 22, are spring mounted with respect to such carriage, to permit the spring mounted blades to yield with respect to their opposed blades under contact loads that could otherwise be of an excessive magnitude.

Figure 5:
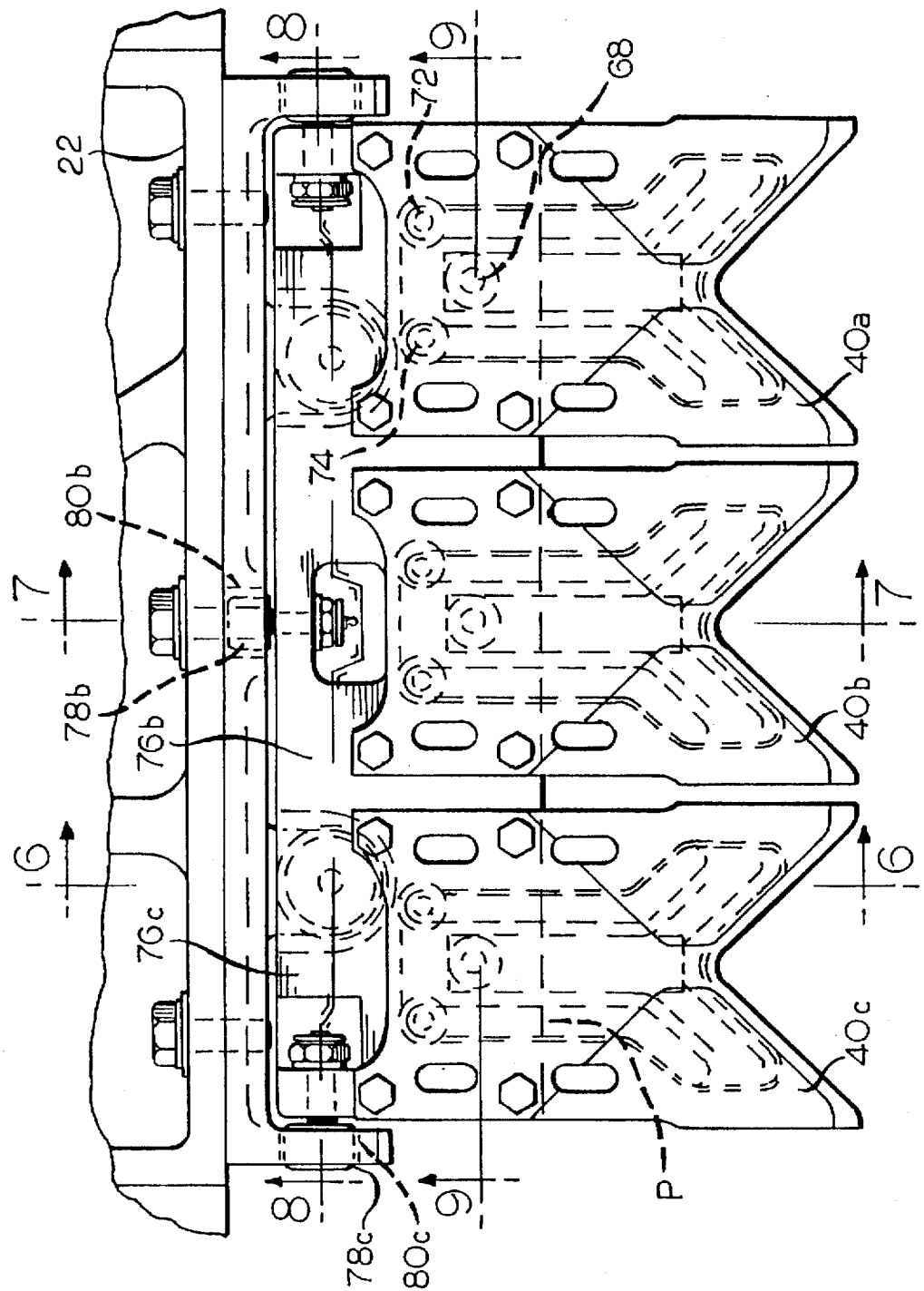
FIG. 5 is a plan view, at an enlarged scale, of a portion of the apparatus of FIGS. 1 and 2.
Figure 6:
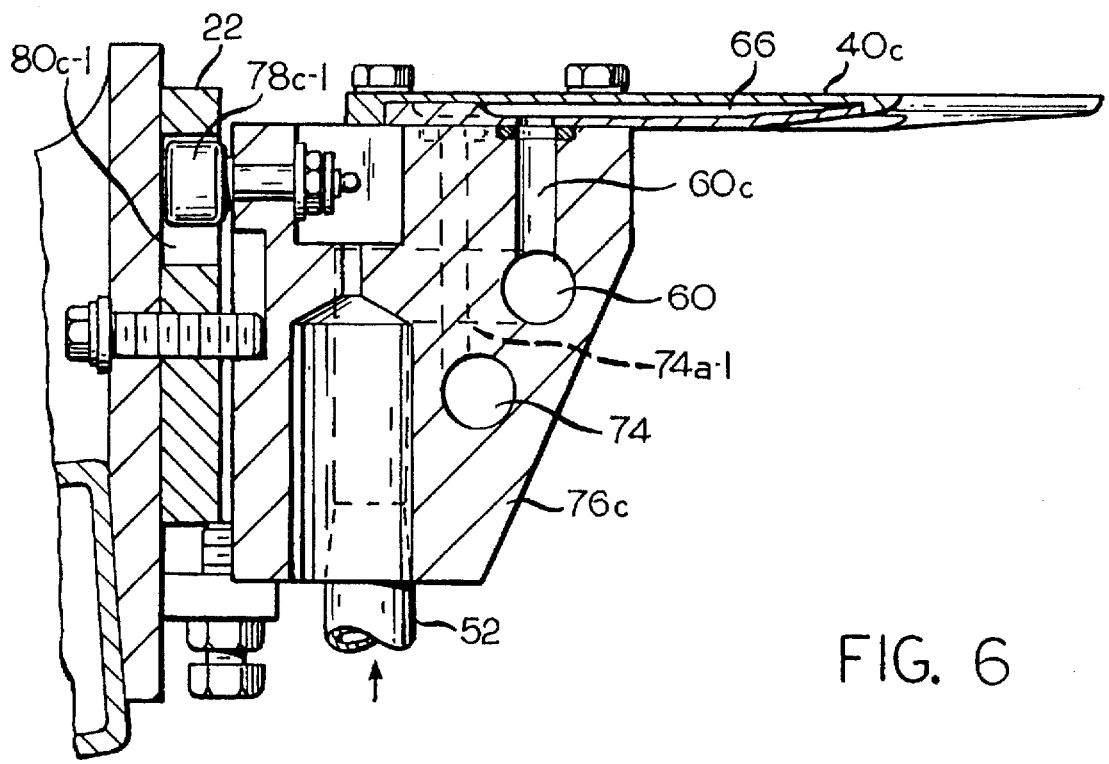
FIG. 6 is a sectional view taken on line 6—6 of FIG. 5.
Figure 7:
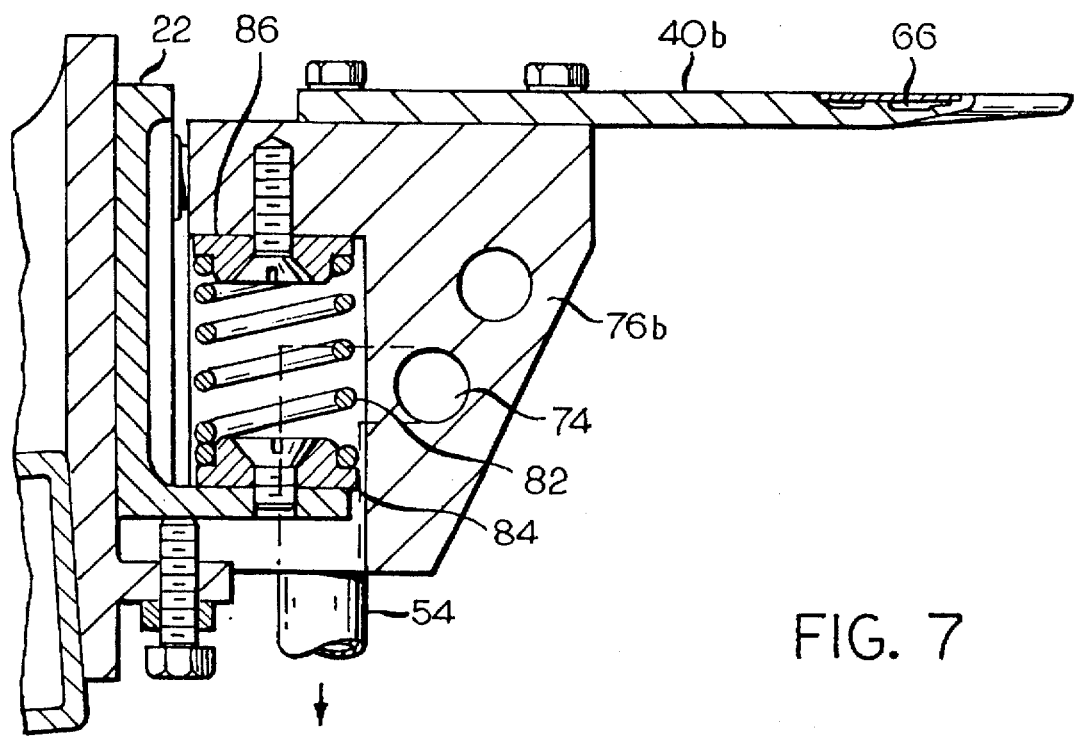
FIG. 7 is a sectional view taken on line 7—7 of FIG. 5.

Thus, as is shown, for example, in connection with the blades 40c, 40b in FIGS. 6 and 7, respectively, each of the blades 40c, 40b is mounted on a block portion 76c, 76b, respectively, of the carriage 22, the block portions 76c, 76b being reciprocable together in a vertical plane with respect to other structure of the carriage 22. To that end, the block portion 76c, is provided with a vertically spaced apart pair of guide rollers 78c-1, 78c-2, that are guided for reciprocation in a vertical plane by slots 80c-1, 80c-2, in the structure of the carriage 22. The block 76b, which carries the blade 40b, is biased toward its uppermost position by a compression spring 82 that is trapped between a horizontal surface 84 of the carriage 22 and a horizontal surface 86 of the block portion 76b, the uppermost limit of the travel of the block 76b. A similar spring biasing element is provided to bias the blade 40a toward its uppermost positions being limited by the vertical extent of the slots 80c-1, 80c-2, which limits the upward travel of the guide rollers 78c-1, 78c-2. As is shown in FIGS. 5 and 6, the block portion 76c is provided with a roller 78b that is rotatable within a slot 80b of the carriage 22, to permit the block portions to move freely in a vertical direction with respect to the carriage 22 while limiting the side to side motion of the block portions.

Because of the upward orientation of the tubular slides 26a, 26b relative to the horizontal orientation of the slides 28a, 28b, the contact loads between the opposed blades 40b, 42b, for example, can be safely maintained at a low value when they first contact one another as they enter their shearing positions. Further travel, which would otherwise increase the contact loads quite rapidly, is safely accommodated by the compression of the compression springs, such as the spring 82, as heretofore described.

Figure 15:
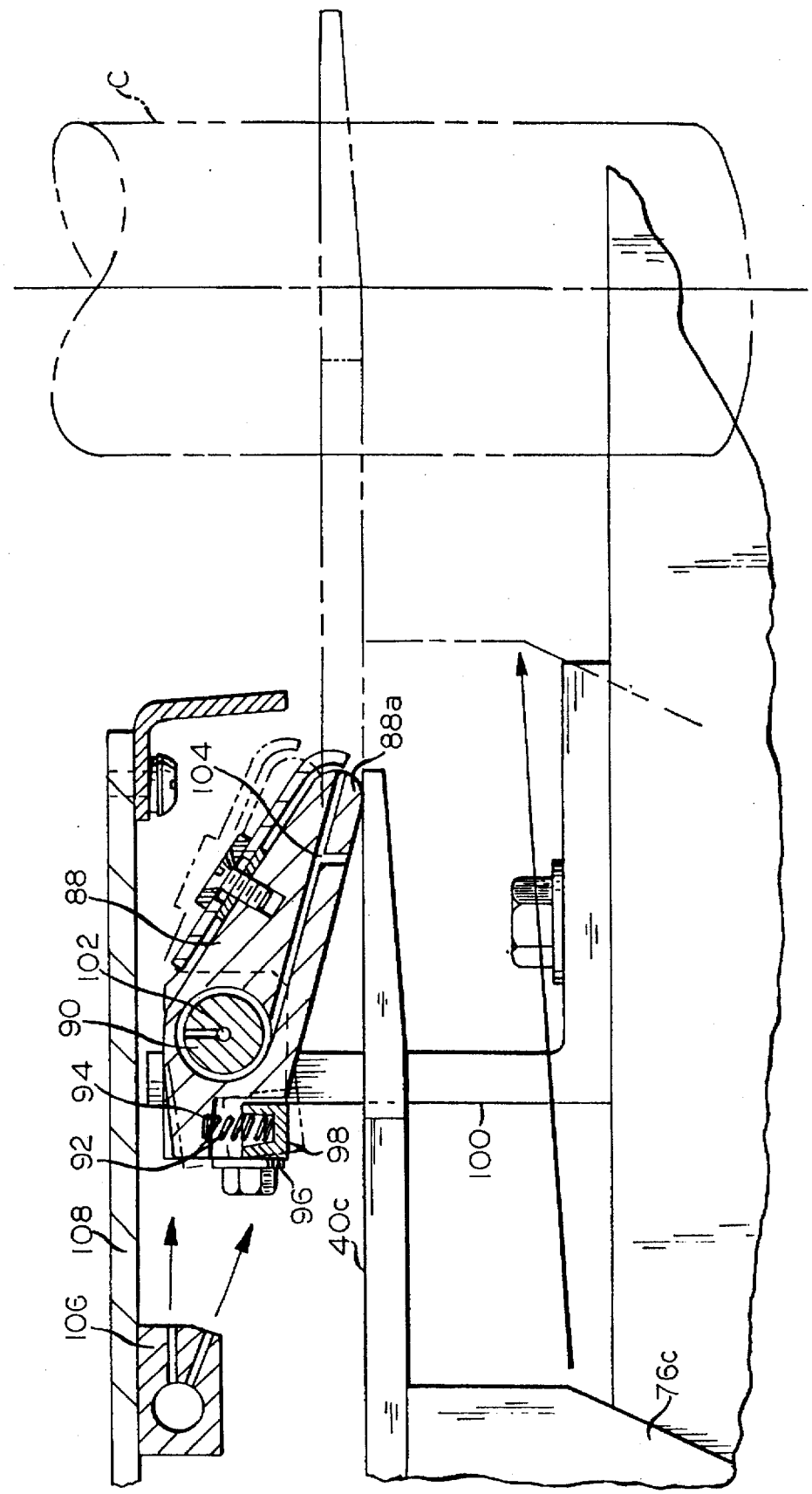
FIG.15 is a fragmentary, elevational view of a portion of the apparatus illustrated in FIGS. 1 and 3.

FIGS. 4 and 15 illustrate a device for lubricating the contact surface of a blade of a set of blades, shown as the upper surface of the blade 40c, prior to its shearing contact with the contact surface of an opposed blade, namely the lower surface of the blade 42c. The upper surface of the blade 40c is contacted by a contact lubricator 88, which is pivotally mounted on a shaft 90. the lubricator 88 is biased downwardly against the upper surface of the blade 40c by a compression spring 92, which is trapped between a surface 94 of the lubricator 88 and a surface 96 of a member 98 that is affixed to a fixed frame member 100.

The shaft 90 receives lubricant, such as lubricating oil, through an internal passage 102, which communicates with a passage 104 in the lubricator 88. The lubricant then exits onto the upper surface of the blade 40c, and is smoothed into a smooth, thin film by a contact portion 88a as the blade 40c is moved forward by the carriage 22. Blades 40a, 40b are lubricated in a similar manner. Cooling of the lubricator 88 is provided by a compressed air distributor 106, which is attached to the underside of a fixed cover plate 108 that covers as much of the carriages 22, 24 as can be properly covered without interfering with the flow of the glass streams A, B, C through the parallel shear apparatus.

Figure 16:
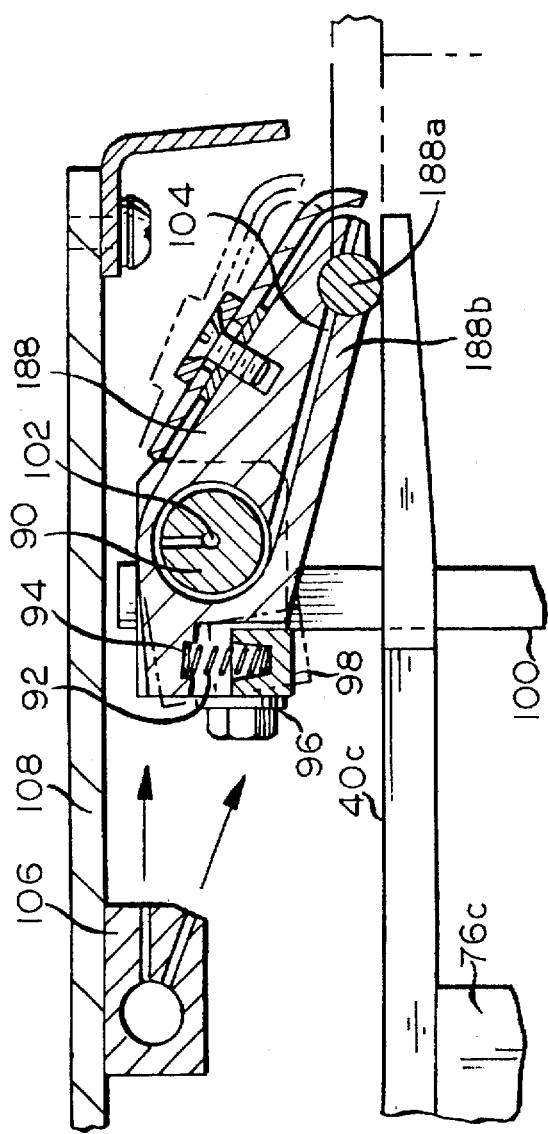
FIG. 16 is a view similar to FIG. 15 showing an alternative embodiment of the present invention.
Figure 17:
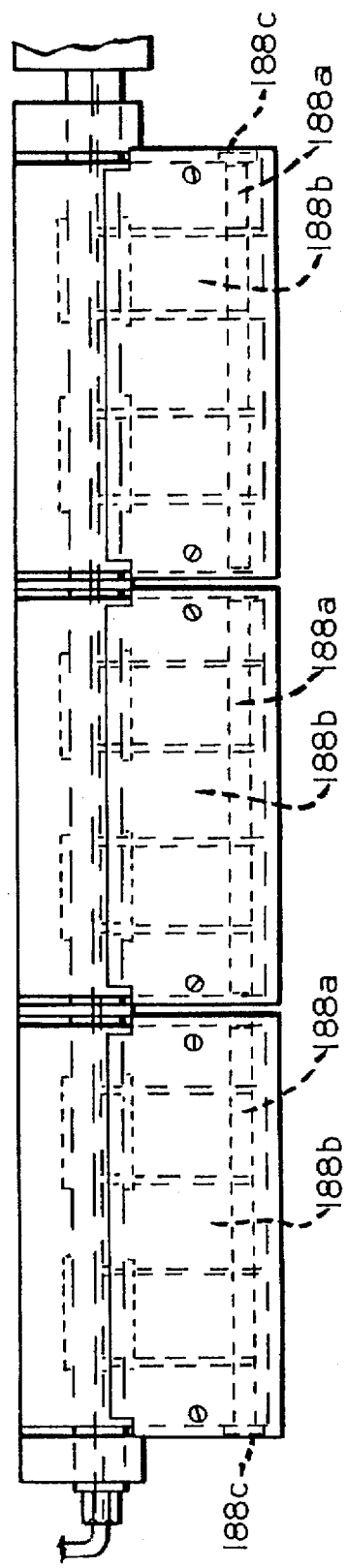
FIG. 17 is a plan view of the apparatus illustrated in FIG. 16.

FIGS. 16 and 17 illustrate a modified embodiment of the lubricator 88 which is illustrated in FIG. 15, the lubricator of FIGS. 16 and 17 being identified by reference numeral 188. The contact portion of the lubricator is a roller 188a, which is rotatingly carried by a non-rotatable member 188b of the lubricator. Thus, the application of lubricant to the upper surface of the blade 40c by the lubricator 188 is by rolling contact, whereas the application of lubricant to the upper surface of the blade 40c by the lubricator 88 of the embodiment of FIG. 15 is by sliding contact. The rollers 188a are axially positioned relative to the non-rotatable members 188b by fixed stop members 188c at the outermost ends of the outermost non-rotatable members. The use of a brush, either rotatingly or non-rotatingly carried by the non-rotatable member 188b is also contemplated.

Although the best mode contemplated by the inventor(s) for carrying out the present invention as of the filing date hereof has been shown and described herein, it will be apparent to those skilled in the art that suitable modifications, variations, and equivalents may be made without departing from the scope of the invention, such scope being limited solely by the terms of the following claims and the legal equivalents thereof.

What is claimed:

1. Shear apparatus for shearing at least one stream of molten glass into individual gobs, said apparatus comprising:
   a first carriage;
   a second carriage, said second carriage being opposed to said first carriage;
   means for slidably supporting said first carriage;
   means for slidably supporting said second carriage;
   a first blade carried by said first carriage;
   a second blade carried by said second carriage;
   drive means for simultaneously driving said first carriage and said second carriage toward and away from one another along travel paths between first positions of said first carriage and said second carriage where said first blade and said second blade are spaced apart from one another and second positions of said first carriage and said second carriage where said first blade and said second blade partly overlap one another to shear a stream of molten glass flowing therebetween; and
   lubricant application means for applying a lubricant to a surface of one of said first blade and said second blade, said surface being a surface that contacts the other of said first blade and said second blade when said first blade and said second blade partly overlap one another, said lubricant application means comprising a contact portion that contacts said surface of said one of said first blade and said second blade to evenly spread the lubricant thereon into a thin, relatively uniform covering.

2. Apparatus according to claim 1 wherein said lubricant application means further comprises:
   biasing means for yieldably biasing said contact portion against said surface of said one of said first blade and said second blade.

3. Apparatus according to claim 1 wherein said contact portion comprises a roller, and means for rotatingly supporting said roller for rolling contact with said surface of said one of said first blade and said second blade.

4. Parallel shear apparatus for shearing at least one stream of molten glass into individual gobs, said apparatus comprising:
   a first carriage;
   a second carriage, said second carriage being opposed to said first carriage;
   first slide means for slidably supporting said first carriage;
   second slide means for slidably supporting said second carriage;
   a first blade carried by said first carriage, said first blade having a first internal circulating passage to permit a cooling fluid to circulate therethrough;
   a second blade carried by said second carriage, said second blade having a second internal passage to permit a cooling fluid to circulate therethrough;
   drive means for simultaneously driving said first carriage and said second carriage toward and away from one another along first and second rectilinear travel paths between first positions of said first carriage and said second carriage where said first blade and said second blade are spaced apart from one another and second positions of said first carriage and said second carriage where said first blade and said second blade partly overlap one another to shear a stream of molten glass flowing therebetween; and
   lubricant application means for applying a lubricant to a surface of one of said first blade and said second blade, said surface being a surface that contacts the other of said first blade and said second blade when said first blade and said second blade partly overlap one another, said lubricant application means comprising a contact portion that contacts said surface of said one of said first blade and said second blade to evenly spread the lubricant thereon into a thin, relatively uniform covering.

5. Apparatus according to claim 4 wherein said contact portion comprises a roller, and means for rotatingly supporting said roller for rolling contact with said surface of said one of said first blade and said second blade.

6. Apparatus according to claim 4 and further comprising:
   first biasing means acting generally perpendicularly to the travel paths for biasing one of said first blade and said second blade toward the other of said first blade and said second blade to ensure contact without excessive contact loads between said first blade and said second blade when said first blade and said second blade partly overlap one another during the shearing of the stream of molten glass.

7. Apparatus according to claim 6 wherein:

one of said first slide means and said second slide means extends substantially horizontally; and the other of said first slide means and said second slide means extends at a small angle with respect to said one of said first slide means and said second slide means to gradually reduce the vertical distance between said first blade and said second blade as said first carriage and said second carriage are moving toward one another.

8. Apparatus according to claim 4 and further comprising:

first coolant circulating means for circulating a cooling fluid through said first internal passage of said first blade; and second coolant circulating means for circulating a cooling fluid through said second internal passage of said second blade.

9. Apparatus according to claim 4 wherein said lubricant application means further comprises:

biasing means for yieldably biasing said contact portion against said surface of said one of said first blade and said second blade.

10. Apparatus according to claim 4 wherein each of said first blade and said second blade comprises:

an upper piece; and a lower piece;

one of said upper piece and said lower piece having a pocket therein;

the other of said upper piece and said lower piece being received in said pocket and having a flow passage formed therein;

said upper piece and said lower piece being joined to one another in a liquid tight manner.

11. Parallel shear apparatus for shearing a plurality of streams of molten glass into individual gobs, said apparatus comprising:

a first carriage;

a second carriage, said second carriage being opposed to said first carriage;

first slide means for slidably supporting said first carriage;

second slide means for slidably supporting said second carriage;

a first plurality of blades carried by said first carriage, each of the blades of said first plurality of blades having a first internal circulating passage to permit a cooling fluid to circulate therethrough;

a second plurality of blades carried by said second carriage, each of the blades of said second plurality of blades having a second internal passage to permit a cooling fluid to circulate therethrough;

drive means for simultaneously driving said first carriage and said second carriage toward and away from one another along first and second rectilinear travel paths between first positions of said first carriage and said second carriage where the blades of said first plurality of blades and the blades of said second plurality of blades are spaced apart from one another and second positions of said first carriage and said second carriage where the blades of said first plurality of blades and the blades of said second plurality of blades partly overlap one another to shear a plurality of streams of molten glass flowing therebetween; and lubricant application means for applying a lubricant to a surface of each of the blades of one of said first plurality of blades and said second plurality of blades, said surface being a surface that contacts a blade of the other of said first plurality of blades and said second plurality of blades when said first plurality of blades and said second plurality of blades partly overlap one another, said lubricant application means comprising a contact portion that contacts said surface of each of the blades of said one of said first plurality of blades and said second plurality of blades to evenly spread the lubricant thereon into a thin, relatively uniform covering.

12. Apparatus according to claim 11 and further comprising:

first biasing means acting generally perpendicularly to the travel paths for biasing the blade of one of said first plurality of blades and said second plurality of blades toward the blades of the other of said first plurality of blades and said second plurality of blades to ensure contact without excessive contact loads between the blades of said first plurality of blades and the blades of said second plurality of blades when the blades of said first plurality of blades and said second plurality of blades partly overlap one another during the shearing of the streams of molten glass.

13. Apparatus according to claim 12 wherein:

one of said first slide means and said second slide means extends substantially horizontally; and the other of said first slide means and said second slide means extends at a small angle with respect to said one of said first slide means and said second slide means to gradually reduce the vertical distance between said first plurality of blades and said second plurality of blades as said first carriage and said second carriage are moving toward one another.

14. Apparatus according to claim 11 and further comprising:

first coolant circulating means for circulating a cooling fluid through the first internal passage of each of the blades of said first plurality of blades; and second coolant circulating means for circulating a cooling fluid through the second internal passage of each of the blades of said second plurality of blades.

15. Apparatus according to claim 11 wherein said lubricant application means further comprises:

biasing means for yieldably biasing said contact portion against said surface of each of the blades of said one of said first plurality of blades and said second plurality of blades.

16. Apparatus according to claim 11 wherein each of the blades of said first plurality of blades and each of the blades of said second plurality of blades comprises:

an upper piece; and a lower piece;

one of said upper piece and said lower piece having a pocket therein;

the other of said upper piece and said lower piece being received in said pocket and having a flow passage formed therein; and said upper piece and said lower piece being joined to one another in a liquid tight manner.

17. Apparatus according to claim 16 wherein said lubricant application means further comprises:

biasing means for yieldably biasing said contact portion against said surface of each of the blades of said one of said first plurality of blades and said second plurality of blades.

18. Apparatus according to claim 17 wherein said contact portion comprises a roller, and means for rotatingly supporting said roller for rolling contact with said surface of each of the blades of said one of said first plurality of blades and said second plurality of blades.

19. A method of shearing at least one vertically flowing stream of molten glass into individual gobs comprising the steps of:

providing first and second opposed, generally horizontally extending double-ended shear blades, each of which has a shearing end;

simultaneously moving the first and second shear blades along first and second paths of travel toward and then away from one another to bring the shearing ends of each of the first and second shear blades into partly overlapping contact with one another in alignment with the stream of molten glass when the first and second shear blades are at innermost locations along the first and second paths of travel; and applying a lubricant to a surface of one of said first blade and said second blade, said surface being a surface that contacts the other of said first blade and said second blade when said first blade and said second blade partly overlap one another, the lubricant being applied by contacting said surface with a lubricant application means to evenly spread the lubricant thereon to form a thin, relatively uniform coating.

20. The method according to claim 19 and further comprising the step of:

resiliently biasing one of the first and second shear blades toward the other of the first and second shear blades to reduce contact loads between the first and second shear blades when they engage one another.

21. The method according to claim 19 wherein the step of applying a lubricant is performed by providing means for rollingly contacting said surface of said one of said first blade and second blade.

22. A method of shearing a spaced apart plurality of generally co-planar vertically flowing streams of molten glass into individual gobs comprising the steps of:

providing first and second pluralities of opposed, generally horizontally extending double ended shear blades, each of which has a shearing end;

simultaneously moving the first and second pluralities of shear blades along first and second paths of travel toward and away from one another to bring the shearing ends of each of the shear blades of one of the first and second pluralities of shear blades into partly overlapping contact with the shearing ends of each of the other of the first and second pluralities of shear blades in alignment with the plurality of streams of molten glass when the first and second pluralities of shear blades are at innermost locations along the first and second paths of travel; and applying a lubricant to a surface of each of the blades in one of the first and second pluralities of blades, said surface being a surface that contacts a blade of the other of said first and second pluralities of blades when said each of the blades in said one of the first and second pluralities of blades partly overlaps a blade in the other of said first and second pluralities of blades when said first and second pluralities of blades partly overlap one another, the lubricant being applied by contacting said surface of said each of the blades in said one of said first and second pluralities of blades with a lubricant application means to spread the lubricant thereon to form a thin, relatively uniform coating.

23. The method according to claim 22 and further comprising the step of:

resiliently biasing one of the first and second pluralities of shear blades toward the other of the first and second pluralities of shear blades to reduce contact loads between the first and second pluralities of shear blades when they engage one another.

24. The method according to claim 23 wherein the step of applying a lubricant is performed by rollingly contacting said surface of said each of the blades in said one of the first and second pluralities of blades.

* * * * *